United States Patent [19]
Du et al.

[11] Patent Number: 5,327,979
[45] Date of Patent: Jul. 12, 1994

[54] COOLANT THROUGH SPINDLE DEVICE

[75] Inventors: Chen-Chung Du; Zhi-Ming Chen; Shao-Yu Hsu; Cheng-Chang Lin; Tsann-Huei Chang, all of Hsinchu, Taiwan

[73] Assignee: Industrial Technology Research Institute, Hsinchu, Taiwan

[21] Appl. No.: 145,140

[22] Filed: Oct. 22, 1993

[51] Int. Cl.⁵ .............................................. B25D 17/22
[52] U.S. Cl. ........................................ 173/74; 173/199
[58] Field of Search ................... 173/197, 74, 199, 64

[56] References Cited
U.S. PATENT DOCUMENTS

| | | | |
|---|---|---|---|
| 2,675,994 | 4/1954 | Smith et al. | 173/197 |
| 3,640,350 | 2/1972 | Stenyick | 173/74 |
| 3,749,186 | 7/1973 | Kutuzov et al. | 173/74 |
| 4,494,613 | 1/1985 | Tamaki et al. | 173/74 |
| 4,854,393 | 8/1989 | Palet | 173/74 |

*Primary Examiner*—Scott Smith
*Attorney, Agent, or Firm*—W. Wayne Liauh

[57] ABSTRACT

A coolant through spindle device is disclosed, including a rotating joint member secured to the rear end of the spindle for conducting coolant into the spindle, the coolant being conducted through a separate coolant passage inside the spindle to the nozzles formed on a cutting tool to be sprayed out thereof so as to fully cool down and lubricate the cutting point thereof, increase machining precision and cutting rate, and prolong service life of the cutting tool. Moreover, by using a switching collar to provide separated coolant passage and pressurized air passage, no residual coolant can follow the pressurized air jet into the tapper hole of the spindle to contaminate the tapper hole.

4 Claims, 3 Drawing Sheets

COOLANT THROUGH SPINDLE DEVICE

FIELD OF THE INVENTION

The present invention relates generally to a coolant through spindle device for use in a machine tool to conduct coolant flow directly to the tip of a working tool through a separate route for the provision of cooling and lubrication to the cutting point.

BACKGROUND OF THE INVENTION

Conventional machine tools comprise a circulation of coolant to cool down the cutting tool and the work piece. However, since the coolant is sprayed toward the work piece from the outside, penetration of the coolant into the interface between the work piece and the cutting edge of the tool is very limited so that no direct cooling and lubrication can be achieved in such conventional machine tools and to provide a sufficient cooling and lubrication with the coolant, the cutting tool should be frequently withdrawn for cooling and lubrication. This slows down the cutting operation. Besides, due to the poor cooling and lubrication that can be achieved in the conventional machine tools, the service life of the cutting tool is substantially shortened.

Recently, to overcome such deficiencies, there was developed a coolant through spindle device which uses a single flow passage for conveyance of both pressurized air and coolant so that residual coolant may remain on the tapper hole formed at the front end of the spindle. This may make dirt, soil and other contaminations or even a small amount of the cutting chips adhere to the inside of the tapper hole and thus causing damages to the spindle itself and the precision thereof.

SUMMARY OF THE INVENTION

It is therefore an objective of the present invention to provide a coolant through spindle device for use in a machine tool to conduct coolant to the cutting point between the work piece and the cutting tool directly via a coolant passage through the spindle of the machine tool, which is separated from air passage, so as to fully cool down and lubricate the cutting point and thus increase the machining precision and prolong the service of the cutting tools.

It is also an objective of the present invention to provide a coolant through spindle device having separated passages for conveying pressurized air and coolant so as to the keep the tapper hole of the spindle from being contaminated by dirt, soil or even the cutting chips.

To achieve the above objectives, there is provided a coolant through spindle device for use in a tool machine comprising a coolant passage extending from a rotating joint through which the coolant is supplied to the tool machine to a switching collar fit between the hollow spindle and the pull rod disposed inside the hollow spindle from which the coolant is conducted into passages formed in the side wall of the hollow spindle to be forwarded to the tool holder and sprayed to the work piece therefrom. An air passage which is separated from the coolant passage is directed to the tapper hole formed on the front end of the spindle into which the tool holder is inserted for cleaning the tapper hole after the tool holder is removed.

BRIEF DESCRIPTION OF THE DRAWING

The present invention will be better understood from the following description of a preferred embodiment of the present invention with reference to the attached drawings, wherein.

DETAILED DESCRIPTION OF THE PREFERRED EMBODIMENT

Figure 2:
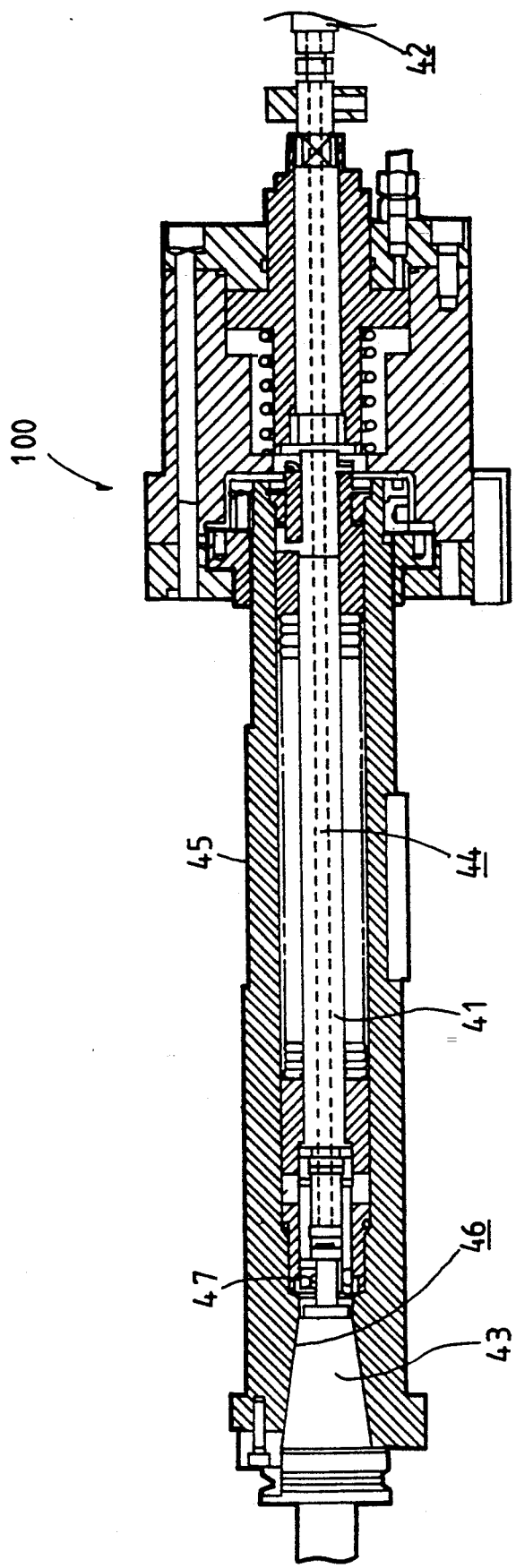
FIG. 2 is a cross-sectional view showing a portion of a machine tool having a conventional tool cooling device mounted thereon.

With reference to FIG. 2, wherein a portion of a machine tool 100 which utilizes a conventional cooling device is illustrated, in the conventional machine tool 100, a hollow spindle 45 is provided to hold a tool (not shown) by a tool holder 43 received within a tapper hole 46 formed on a front free end of the spindle 45. The tool holder 43 is held inside the tapper hole 46 by a tool gripping device 47. Inside the spindle 45, a pull rod 41 is movably disposed for gripping and/or releasing the tool from the spindle 45.

In the conventional cooling device incorporated in the machine tool 100 of FIG. 2, an air passage 44 is formed through the pull rod 41 for forwarding pressurized air to the tapper hole 46 of the spindle 45. Am inlet port 42 is provided on the machine tool 100 through which the pressurized air is fed. The pressurized air is transmitted through the air passage 44 inside the pull rod 41.

In such a conventional machine tool 100 shown in FIG. 2, the coolant has to be sprayed to the work piece from the outside and this leads in the deficiencies mentioned previously. To overcome these deficiencies, a coolant through spindle device constructed in accordance with the present invention will be described in detail hereinafter.

Figure 1:
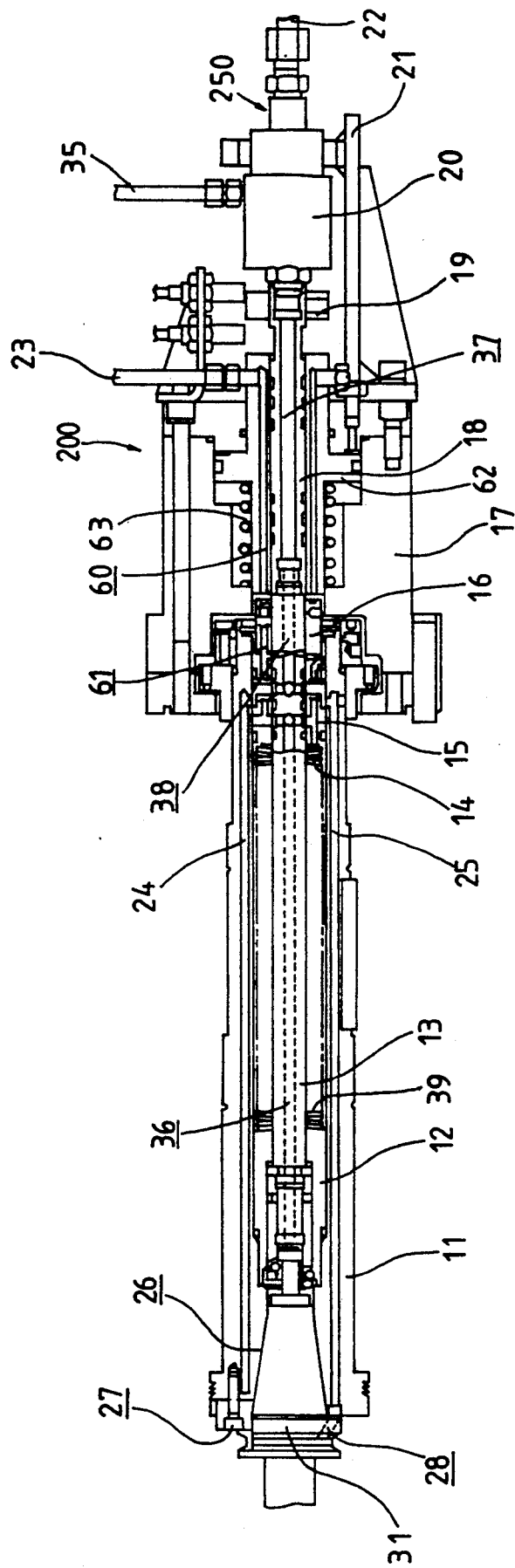
FIG. 1 is a cross-sectional view showing a portion of a machine tool in which the coolant through spindle device constructed in accordance with the present invention is incorporated, a tool holder being shown assembled in the machine tool.

With particular reference to FIG. 1, wherein a cross-sectional view of the coolant through spindle device of the present invention, generally designated with the reference 250, incorporated in a machine tool 200, which is similar to the machine tool 100 shown in FIG. 2 and only a portion of which is shown in the drawing, is given, the coolant through spindle device 250 of the present invention comprises:

(1) a spindle 11 in the form of an elongated hollow cylinder with a hydraulic cylinder 17 (to be further described hereinafter) mounted in the proximity of a rear end thereof;

(2) a pull rod 13 movably disposed within the spindle 11, having formed therein a central passage 36 for the conveyance of pressurized air and a second passage 38 for the conveyance of coolant;

(3) a switching collar 15 fit between the inside surface of the spindle 11 and the pull rod 13, the switching collar being movable by an adjusting nut member 16 in contact engagement therewith for adjustment;

(4) a hydraulic cylinder 17 mounted in the proximity of the rear end of the spindle 11 for providing a tool release motion;

(5) a belleville spring 39 disposed inside the hollow spindle 11 to act upon the pull rod 13 for biasing the pull rod 13 toward the rear end of the spindle 11; and (6) a connecting rod 18 having a front end secured to the pull rod 13 and a rear end connected to a rotating joint member 20 for the delivery of the coolant from a coolant inlet port 22 to the second passage 38 formed inside the pull rod 13.

The coolant through spindle device 250 of the present invention, by incorporating the above elements, provides a great enhancement in cooling and lubricating the cutting tool and the cutting point thereof with the work piece (not shown) and thus increases the machining precision and cutting rate and also keeps the tapper hole 26 of the spindle 11 cleaned from be contaminated by dirt, soil or even the cutting chips.

Further, the coolant through spindle device 250 of the present invention also comprises:

(1) an adjusting nut member 16 fit on the pull rod 13 for adjusting the location of the switching collar 15; and (2) a rotating joint member 20 having a front end secured to the connecting rod 18 and a rear end with the coolant inlet port 22 formed thereon, the rotating joint member 20 also having a coolant relief port 35 for relief of the leakage of the high pressure coolant.

In accordance with the present invention, pressurized air is conducted into the machine tool 200 through an air inlet port 23 while the coolant is separately conveyed into the machine tool 200 via the inlet port 22 formed on the rotating joint member 20 and conducted forward, through a passage 37 formed inside the connecting rod 18, into the second passage 38 inside the pull rod 13.

The second passage 38 transmits the coolant into the switching collar 15 and the coolant route is then switched to two separated deep holes 24 and 25 formed in the cylindrical wall of the spindle 11. This allows the coolant to flow out of the spindle 11 through front openings 27 and 28 of the deep holes 24 and 25 formed on the front end of the spindle 11.

Inside the tapper hole 26 of the spindle 11, a tool holder 31 is inserted and held by a tool gripping device 12 inside the spindle 11. The tool gripping device 12 is of such a kind that, when pushed toward the tapper hole 26 of the spindle 11 against the belleville spring 39 by the pull rod 13, releases the tool holder 31 and thus the tool (not shown) held therein and, when released by the pull rod 13 and under the action of the belleville spring 39 to return to the original position, is capable to securely hold the tool holder 31 inside the tapper hole 26 of the spindle 11.

Figure 3:
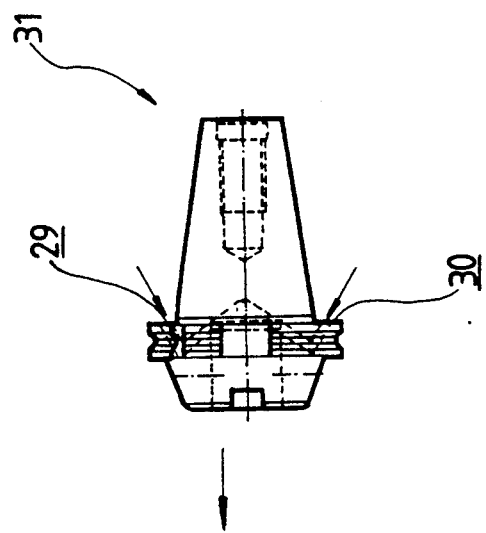
FIG. 3 is a front view showing a tool holder of the machine tool shown in FIG. 1.

The tool holder 31 is more particularly shown in FIG. 3. The coolant that flows out of the spindle 11 through the front openings 27 and 28 enters the nozzle holes 29 and 30 formed on the tool holder 31, particularly shown in FIG. 3, and then sprayed out thereof to the cutting tool and the work piece.

The air that enters the inlet port 23 is forwarded through an air passage 60 formed inside the piston portion 62 of the hydraulic cylinder 17 and an passage 61 formed inside the adjusting nut member 16 to the switching collar 15. The passage 60 and the passage 61 are separated from each other during the work piece machining operation. Once the tool is to be released from the machine tool 200, hydraulic pressure is transmitted into the hydraulic cylinder 17 from inlet passage 21 to move the piston 62 against spring 63 so as to have the piston 62 contact and move the pull rod 13 to force the tool holder 31 to disengage from the tool gripping device 12.

In releasing the tool, the hydraulic cylinder 17 moves forward to contact the pull rod 13 and meanwhile, the passages 60 and 61 are jointed together to allow the pressurized air to flow through the hydraulic cylinder 17 and the adjusting nut member 16 to enter the central passage 36 via the switching collar 15. The pressurized air is then jetted toward the tapper hole 26 of the spindle 11 clean the tapper hole 26.

In installing the tool, the hydraulic cylinder 17 is actuated to move the pull rod 13 and the tool gripping device 12 toward the tapper hole 26 of the spindle 11 to allow the tool and the tool holder 31 to be engaged by the tool gripping device 12 and by de-actuating the hydraulic cylinder 17, the belleville spring 39 forces the pull rod 13 back to its original position and thus allowing the tool gripping device 12 to securely hold the tool holder 31 and the tool therein.

Normally, the hydraulic cylinder 17 is separated from the spindle 11 and the pull rod 13 during operation. The hydraulic cylinder 17 contacts and moves the pull rod 13 only when the tool is to be released and/or installed. This substantially reduces the load at the end of the spindle 11 and thus provides dynamic balance to the spindle 11 when in high speed rotation.

As shown in FIG. 1, preferably, a sensing means 19 is provided in the machine tool 200 to monitor the location of the pull rod 13.

The advantages and functions provided by the present invention are:

(1) provision of a coolant through spindle device to conduct the coolant directly to the cutting edge of cutting tool to fully cool down and lubricate the cutting point so as to improve cutting rate, prolong the service life of the tools and provide high machining precision.

(2) provision of a coolant through spindle device to keep the tapper hole at the front end of the spindle clean by using separated air and coolant routes.

It is apparent that although the invention has been described in connection with the preferred embodiment, it is contemplated that those skilled in the art make changes and modifications to the preferred embodiments without departing from the spirit and scope of the invention as defined in the appended claims.

What is claimed is:

1. A coolant through spindle device for use in a machine tool, said device comprising:

an elongated hollow cylindrical spindle having a front end with a tapper hole formed thereof for receiving and holding a tool holder therein and an opposite rear end;

a pull rod disposed inside said spindle, having a central passage for pressurized air and a second passage for the coolant;

a belleville spring biasing said pull rod away from the front end of said spindle;

a switching collar fit between an inside surface of said spindle and said pull rod;

a hydraulic cylinder disposed in the proximity of the rear end of said spindle and engageable with said pull rod for moving said pull rod against said belleville spring to install or release a cutting tool from said spindle;

a connecting rod having a front end secured to said pull rod and a rear end connecting to a rotating joint member;

said rotating joint member having a coolant inlet port to allow the coolant to enter a passage formed inside said connecting rod therethrough, said coolant being further conducted toward said switching collar through the second passage inside said pull rod to be switched to deep holes formed in the cylindrical wall of said spindle to be sprayed to the cutting tool from nozzle holes formed on said tool holder.

2. A device as claimed in claim 1, wherein said hydraulic cylinder is separated from said spindle during operation of the machine tool.

3. A device as claimed in claim 1, wherein in releasing the cutting tool, said hydraulic cylinder moves said pull rod and wherein the pressurized air is conducted through the central passage by said switching collar to be jetted into the tapper hole for cleaning.

4. A device as claimed in claim 1, wherein said switch collar comprises an adjusting nut member fit on said pull rod for adjusting location thereof.

* * * * *